United States Patent
Lin et al.

(10) Patent No.: US 8,646,950 B2
(45) Date of Patent: *Feb. 11, 2014

(54) DISPLAY APPARATUS

(71) Applicants: Yi-Fan Lin, Hsin-Chu (TW); Shih-Yao Lin, Hsin-Chu (TW); Chieh-Jen Cheng, Hsin-Chu (TW); Po-Hung Chen, Hsin-Chu (TW)

(72) Inventors: Yi-Fan Lin, Hsin-Chu (TW); Shih-Yao Lin, Hsin-Chu (TW); Chieh-Jen Cheng, Hsin-Chu (TW); Po-Hung Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,974

(22) Filed: Oct. 23, 2012

(65) Prior Publication Data

US 2013/0107571 A1 May 2, 2013

Related U.S. Application Data

(63) Continuation-in-part of application No. 13/450,642, filed on Apr. 19, 2012.

(30) Foreign Application Priority Data

Oct. 28, 2011 (TW) .............................. 100139393 A
Jun. 21, 2012 (TW) .............................. 101122250 A

(51) Int. Cl.
*B60Q 3/04* (2006.01)

(52) U.S. Cl.
USPC ............ 362/362; 362/329; 362/632; 362/634

(58) Field of Classification Search
USPC ........................................................ 362/362
See application file for complete search history.

(56) References Cited

U.S. PATENT DOCUMENTS

| | | | |
|---|---|---|---|
| 2002/0093811 A1* | 7/2002 | Chen | 362/31 |
| 2007/0086213 A1* | 4/2007 | Hsieh | 362/633 |
| 2007/0211496 A1* | 9/2007 | Ito | 362/633 |
| 2011/0255026 A1 | 10/2011 | Pan et al. | |
| 2012/0044714 A1* | 2/2012 | Lee et al. | 362/609 |
| 2013/0063978 A1* | 3/2013 | Gettemy et al. | 362/609 |

FOREIGN PATENT DOCUMENTS

| | | |
|---|---|---|
| CN | 10212164 A | 7/2011 |
| TW | 201005384 | 2/2010 |
| TW | I345097 | 7/2011 |

* cited by examiner

*Primary Examiner* — Mary Ellen Bowman
(74) *Attorney, Agent, or Firm* — WPAT, PC; Justin King

(57) ABSTRACT

A display apparatus includes a panel module and a backlight module. The backlight module is disposed under the panel module. The backlight module includes a frame, a light guide plate, and a reflector. The frame supports the edge of the light guide plate. The reflector is disposed at the bottom of the light guide plate. The edge of the reflector and the edge of the frame horizontally form an engaging seam without overlapping, and the engaging seam is substantially in a serrated shape.

7 Claims, 9 Drawing Sheets

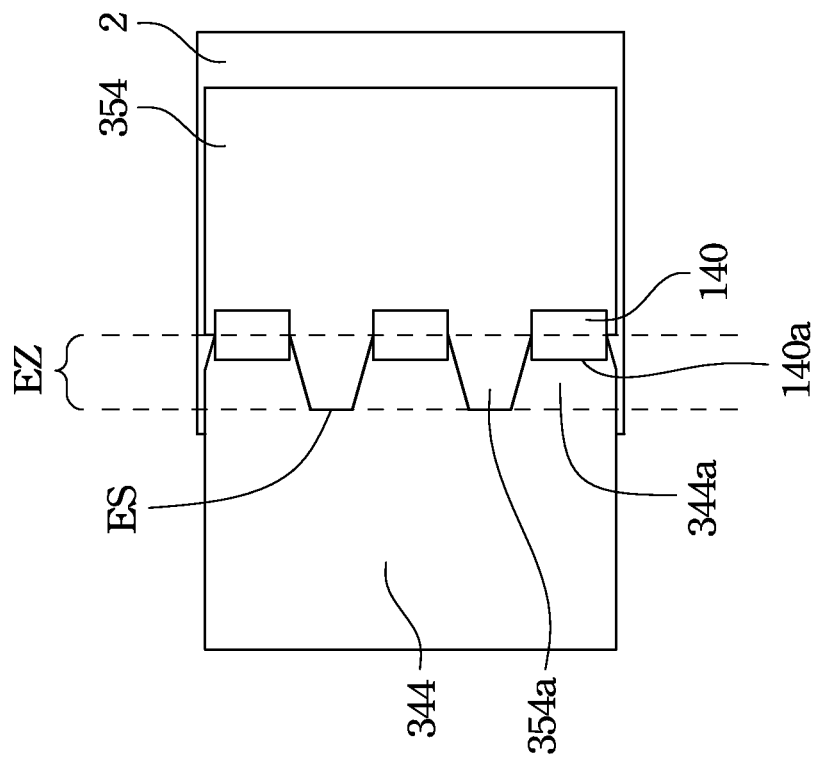
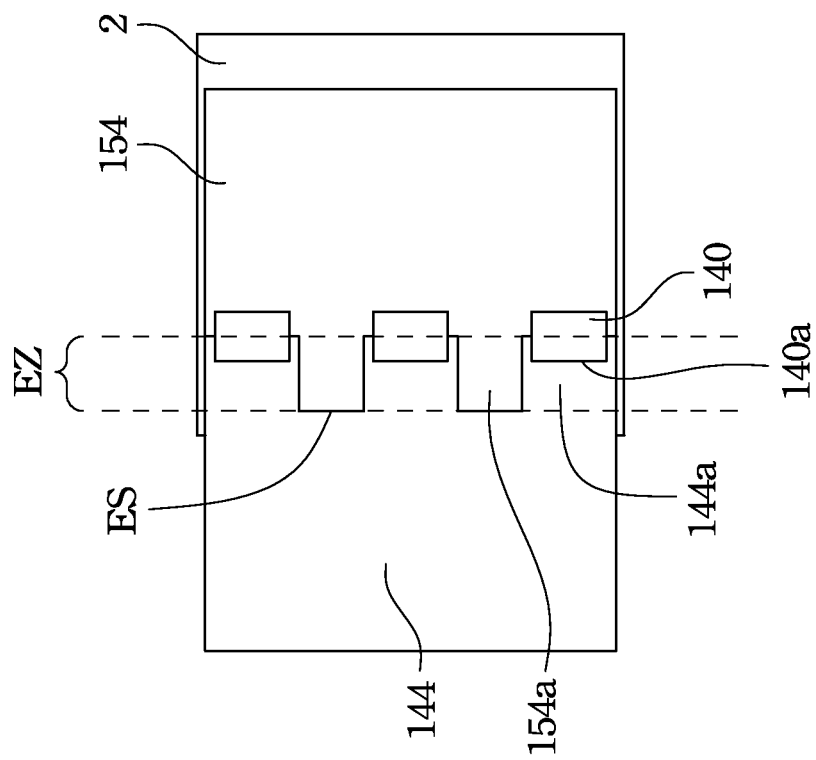
Fig. 2A
Fig. 2B

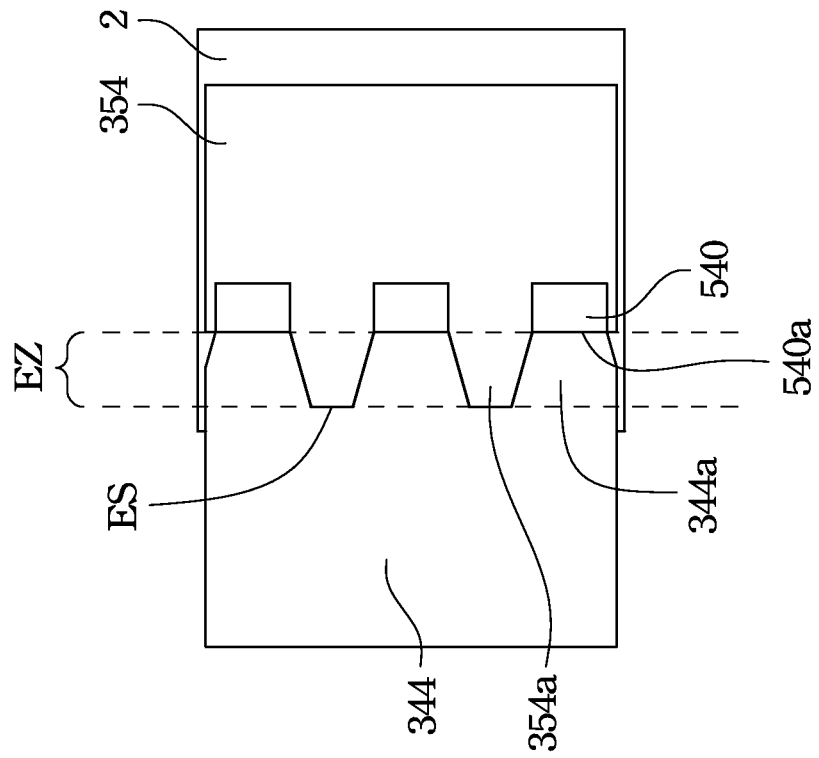
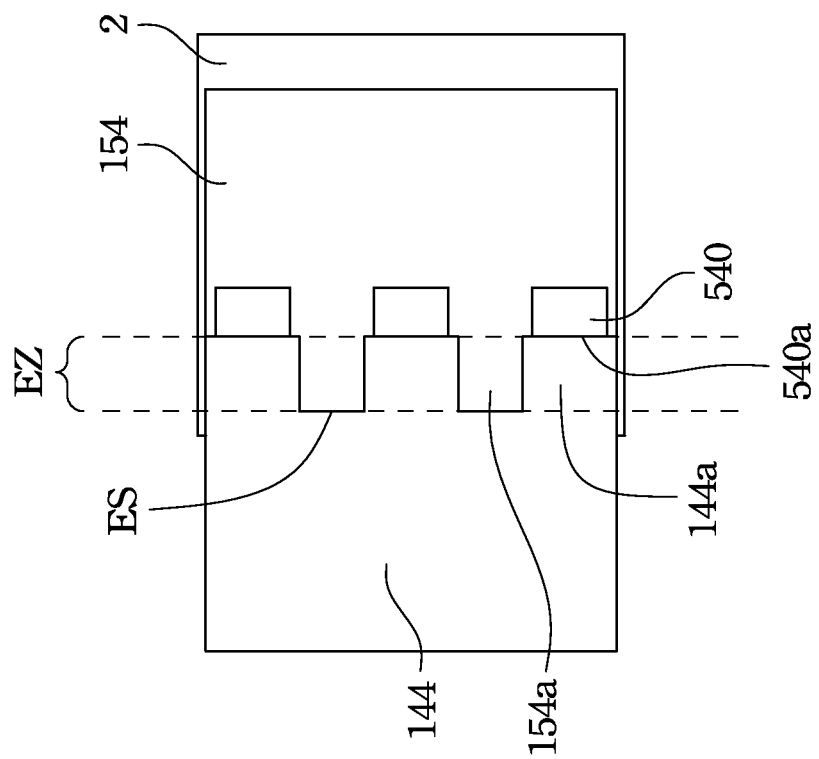
Fig. 3A
Fig. 3B

DISPLAY APPARATUS

CROSS-REFERENCE TO RELATED APPLICATIONS

This application is a continuation-in-part application of U.S. application Ser. No. 13/450,642, filed Apr. 19, 2012, which claims priority to Taiwan Application Serial Number 100139393, filed Oct. 28, 2011. This application also claims priority to Taiwan Application Serial Number 101122250, filed Jun. 21, 2012. The entire disclosures of all the above applications are hereby incorporated by reference herein.

BACKGROUND

1. Field of Invention

The present invention relates to a display apparatus.

2. Description of Related Art

In recent years, owing to the rapid development of the electronics and information industries, products developed by these industries are becoming increasingly sophisticated. For current personal computers, in addition to efforts to realize faster and more powerful computing units and to offer a wide range of peripheral equipment to meet user needs, a key area of development in the computer industry relates to realizing a more compact size, lighter weight, and thinner profile for personal computers.

Liquid crystal displays have the advantages of high definition, small size, lightweight, low driving voltage, and low power consumption. Moreover, liquid crystal displays can be used in a wide range of applications, such as in portable televisions, mobile phones, camcorders, notebook computers, desktop monitors, and other consumer electronics products, and as a result, have become the most commonly used display configuration.

With the continued advancement in various technologies, liquid crystal displays are expected to become even thinner. To satisfy such a requirement, the inner components of liquid crystal displays are manufactured as thin as possible. For instance, a thin glass substrate of a width of less than 0.5 mm may be used to manufacture a liquid crystal display.

However, the foregoing approach not only easily results in bending of the substrates of the liquid crystal displays, but also results in difficulties related to transporting the liquid crystal displays, so as to reduce the yield rate of manufacture. Furthermore, when the liquid crystal displays utilizing such substrates are inadvertently bumped, breakages, nicks and other damage to the substrates may occur. Although an approach of replacing the thin glass substrate with a thin membrane made of rubber has been considered, limitations such as the temperature of manufacturing the thin membrane make this approach impractical.

A manufacturing method has been proposed in which the thickness of a liquid crystal display is reduced by etching one of the substrates therein. According to this manufacturing method, the thickness of one of the substrates is etched to about 0.1-0.2 mm, and the thickness of another one of the substrates is maintained at about 0.3-1.1 mm. Through such a configuration, a sufficient strength for the liquid crystal display is ensured. However, liquid crystal displays manufactured by such a manufacturing method are still not sufficiently thin and lightweight. Moreover, such a method increases the overall cost of manufacture.

Therefore, many in the industry are endeavoring to develop techniques that enable display apparatuses to be made thinner without reducing the structural strength thereof.

SUMMARY

In order to solve the problems of the prior art, the invention provides an improved display apparatus. A frame and a reflector of a backlight module of the display apparatus are designed to be at the same level, so that the overall thickness of the display apparatus can be decreased through a reduction in the thickness of the reflector. In addition, in order to support a light guide plate of the backlight module, support from the frame is necessary under the light guide plate. Therefore, the frame of the invention is designed to partially extend toward the light guide plate, so as to achieve the function of supporting the light guide plate. Furthermore, the invention extends the reflector to a front-lower location relative to light-emitting surfaces of light sources of the backlight module, so that the backlight module provides a sufficient brightness to meet requirements. That is, the reflector of the invention has light-reflecting portions that are partially extended to the light sources, so that the reflector provides a design for improving light utilization rate. Moreover, the invention also designs the edge of the frame and the edge of reflector that are engaged to each other in a manner such that these edges are not straight. Through such a configuration of the frame and the reflector, not only is the engaging strength between the frame and the reflector enhanced, but also, downward drooping of the reflector does not easily occur.

According to an embodiment of the invention, a display apparatus includes a panel module and a backlight module. The backlight module is disposed under the panel module. The backlight module includes a frame, a light guide plate, and a reflector. The frame supports the edge of the light guide plate. The reflector is disposed at the bottom of the light guide plate. The edge of the reflector and the edge of the frame horizontally form an engaging seam without overlapping, and the engaging seam is substantially in a serrated shape.

In an embodiment of the invention, the frame further includes a plurality of first extending portions extended toward the reflector for supporting the edge of the light guide plate and horizontally engaging the reflector without overlapping.

In an embodiment of the invention, the reflector further includes a plurality of second extending portions extended toward the frame, and the second extending portions and the first extending portions horizontally form an engaging seam without overlapping.

In an embodiment of the invention, the display apparatus further includes a plurality of light sources. Each of the light sources is disposed on the frame, substantially faces the corresponding second extending portion, and is not located between two adjacent first extending portions.

In an embodiment of the invention, each of the light sources has a light-emitting surface, and each of the light-emitting surfaces is located on the corresponding second extending portion and abuts against the light guide plate.

In an embodiment of the invention, the horizontal width of each of the second extending portions is larger than the horizontal width of the corresponding light-emitting surface, and the horizontal width of each of the second extending portions is gradually expanded in a direction away from the corresponding light-emitting surface.

In an embodiment of the invention, each of the first extending portions and each of the second extending portions are substantially trapezoidal.

In an embodiment of the invention, each of the light sources has a light-emitting surface, and each of the light-emitting surfaces is exactly aligned to the edge of the corresponding second extending portion and abuts against the light guide plate.

In an embodiment of the invention, each of the first extending portions is engaged between two adjacent second extending portions, or each of the second extending portions is engaged between two adjacent first extending portions.

In an embodiment of the invention, each of the first extending portions and each of the second extending portions are substantially rectangular.

In an embodiment of the invention, the first extending portions and the second extending portions form an engaging zone. The engaging zone includes the engaging seam. The frame and the reflector substantially have the same thickness in the engaging zone.

In an embodiment of the invention, the surface of the frame and the surface of the reflector that contact the bottom of the light guide plate are substantially coplanar.

In an embodiment of the invention, the display apparatus further includes a bezel and a tape. The bezel is assembled to the inner wall of the frame. The edge of the panel module is supported on the bezel. The panel module is located over the backlight module. The tape is adhered to the external surface of the frame and the external surface of the reflector, and extends to the edge of the panel module along the sidewall of the frame.

In an embodiment of the invention, the display apparatus further includes a tape for adhering to the external surface of the frame and the external surface of the reflector.

In an embodiment of the invention, the first extending portions and the second extending portions form an engaging zone. The engaging zone includes the engaging seam, and the tape is extended to adhere to the engaging zone.

The invention further provides an improved backlight module.

According to an embodiment of the invention, a backlight module includes a frame, a reflector, and a light guide plate. The frame has a first joint edge. The contour of the first joint edge is formed to have a plurality of slopes or curvatures. The reflector has a second joint edge. The second joint edge and the first joint edge are complementary and horizontally engaged to each other without overlapping. The light guide plate is disposed on the reflector. A portion of the frame that is adjacent to the first joint edge supports the edge of the reflector.

According to another embodiment of the invention, a backlight module includes a reflector, a frame, and a light guide plate. The edge of the frame has a plurality of protruding structures. The edge of the reflector is horizontally engaged between any two adjacent protruding structures without overlapping. The light guide plate is disposed on the reflector and supported by the protruding structures.

According to another embodiment of the invention, a display apparatus includes a panel module and a backlight module. The backlight module is disposed under the panel module. The backlight module includes a frame, a reflector, and a light guide plate. An edge of the reflector overlaps the frame. The light guide plate is supported on the reflector. The frame and the reflector respectively have a first lower surface and a second lower surface at a side of the frame and the reflector away from the panel module. The first lower surface and the second lower surface respectively have a first height and a second height relative to the panel module. The first height is equal to or smaller than the second height.

In an embodiment of the invention, the frame includes an overlapping portion. The first lower surface is located at a side of the overlapping portion away from the panel module. The reflector includes a main body and a bending structure. The light guide plate is supported on the main body. The second lower surface is located at a side of the main body away from the panel module. The bending structure is located at an edge of the main body and overlaps the overlapping portion.

In an embodiment of the invention, the bending structure includes a first bending portion and a second bending portion. The first bending portion is connected to the main body and bent relative to the main body toward the panel module. The second bending portion is connected to the first bending portion and bent relative to the first bending portion toward the frame, so as to overlap the overlapping portion.

In an embodiment of the invention, the overlapping portion has a first hook. The bending structure has a second hook. The first hook is engaged with the second hook.

In an embodiment of the invention, the bending structure is substantially inverted U-shaped.

In an embodiment of the invention, the display apparatus further includes a single sided adhesive tape. The single sided adhesive tape is adhered to a side of the frame and the reflector adjacent to the panel module, so as to join the frame and the reflector.

In an embodiment of the invention, the display apparatus further includes a double-sided adhesive tape. The double-sided adhesive tape is adhered between the first lower surface and the reflector, so as to join the frame and the reflector.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2A is a partial top view of components of a display apparatus in FIG. 1A according to an embodiment of the invention, in which an engaging zone is illustrated by dotted lines;

FIG. 2B is a partial top view of components of a display apparatus in FIG. 1A according to another embodiment of the invention, in which an engaging zone is illustrated by dotted lines;

FIG. 3A is a partial top view of components of a display apparatus in FIG. 2A according to another embodiment of the invention, in which an engaging zone is illustrated by dotted lines;

FIG. 3B is a partial top view of components of a display apparatus in FIG. 2B according to another embodiment of the invention, in which an engaging zone is illustrated by dotted lines;

DETAILED DESCRIPTION

Figure 1A:
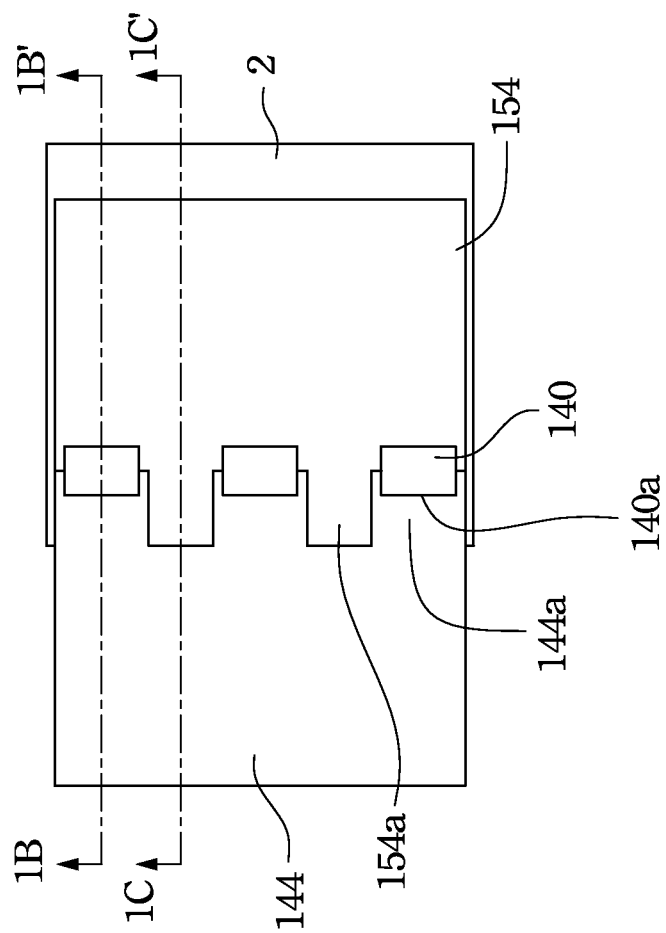
FIG. 1A is a partial top view of some components of a display apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

An improved display apparatus is provided. Specifically, a frame and a reflector of a backlight module of the display apparatus are designed to be at the same level, so that the overall thickness of the display apparatus can be decreased through a reduction in the thickness of the reflector. In addition, in order to support a light guide plate of the backlight module, support from the frame is necessary under the light guide plate. Therefore, the frame of the invention is designed to partially extend toward the light guide plate, so as to achieve the function of supporting the light guide plate. Furthermore, the invention extends the reflector to a front-lower location relative to light-emitting surfaces of light sources of the backlight module, so that the backlight module provides a sufficient brightness to meet requirements. That is, the reflector of the invention has light-reflecting portions that are partially extended to the light sources, so that the reflector provides a design for improving a light utilization rate. Moreover, the invention also designs the edge of the frame and the edge of the reflector that are engaged to each other in a manner such that these edges are not straight. Through such a configuration of the frame and the reflector, not only is the engaging strength between the frame and the reflector enhanced, but also, downward drooping of the reflector does not easily occur.

Figure 1B:
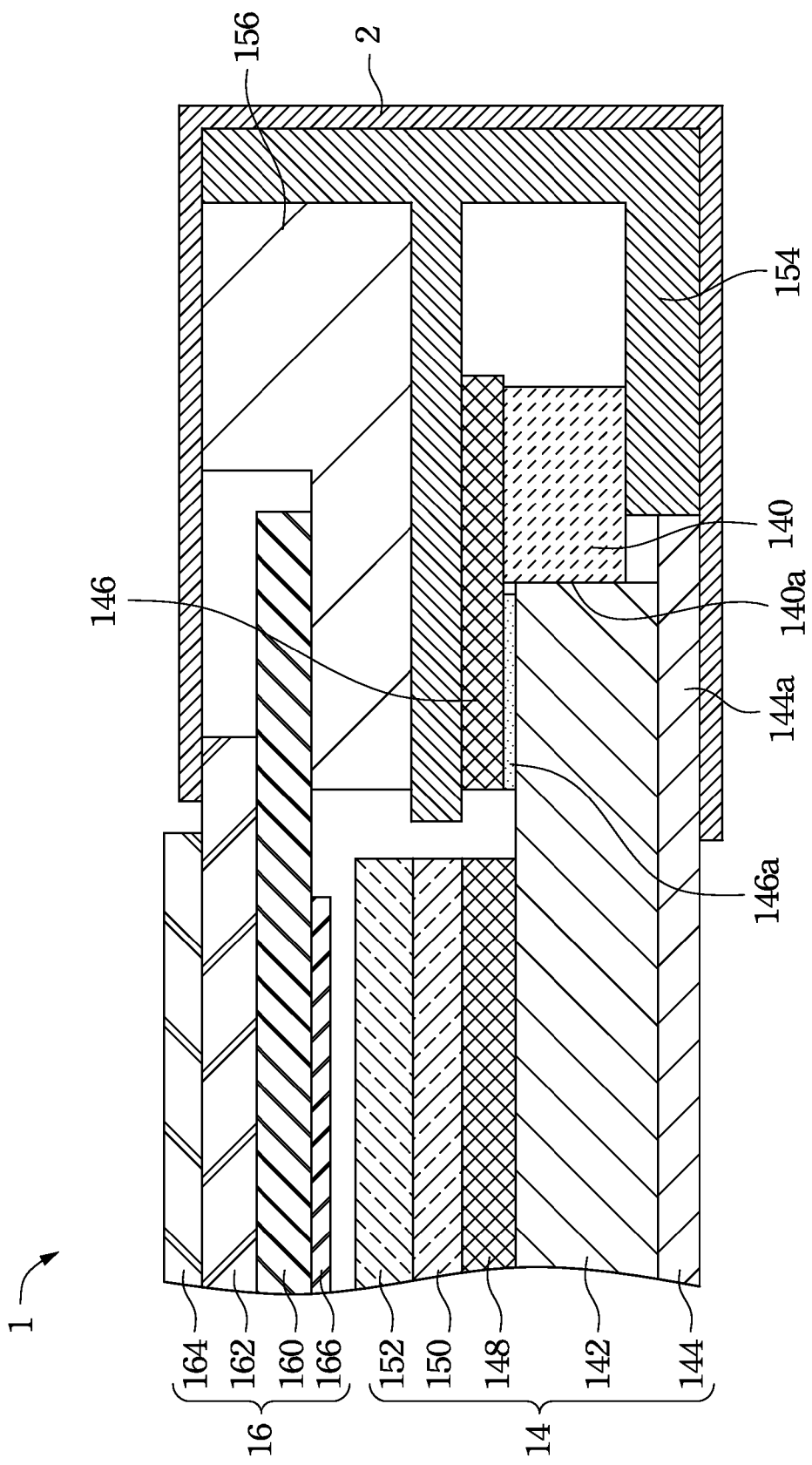
FIG. 1B is a sectional view of the display apparatus in FIG. 1A along line 1B-1B' according to an embodiment of the invention.
Figure 1C:
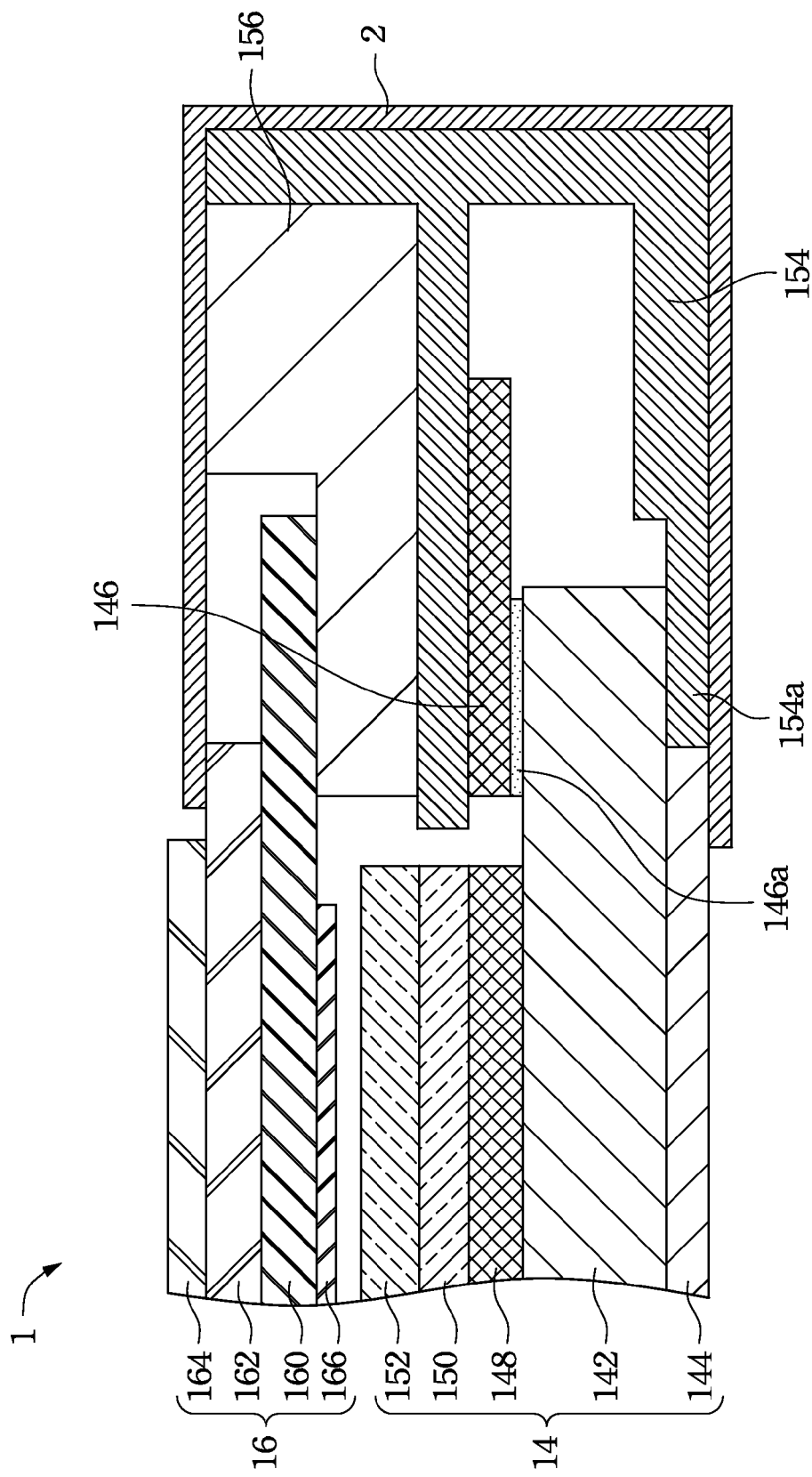
FIG. 1C is a sectional view of the display apparatus in FIG. 1A along line 1C-1C' according to an embodiment of the invention.

FIG. 1A is a partial top view of some components of a display apparatus 1 according to an embodiment of the invention. FIG. 1B is a sectional view of the display apparatus 1 in FIG. 1A along line 1B-1B' according to an embodiment of the invention. FIG. 1C is a sectional view of the display apparatus 1 in FIG. 1A along line 1C-1C' according to an embodiment of the invention.

The electronic apparatus utilizing the display apparatus 1 of the invention shown in FIGS. 1A, 1B, and 1C can be a portable computer device (e.g., a notebook computer, a tablet computer, etc.) or a portable electronic product (e.g., a PDA, a mobile phone, a game console, etc.), but the invention is not limited in this regard. That is, the electronic apparatus that utilizes the display apparatus 1 of the invention can be any electronic product that has a display function. As long as there is a requirement to reduce the thickness of the display apparatus 1, the concepts of the invention can be applied to design the display apparatus 1.

As shown in FIG. 1A, FIG. 1B, and FIG. 1C, the display apparatus 1 of the invention includes a backlight module 14 and a panel module 16. The backlight module 14 of the display apparatus 1 includes light sources 140, a light guide plate 142, a reflector 144, a circuit board 146, a diffusing film 148, a prism layer 150, optical films 152, a frame 154, and a bezel 156. The bezel 156 of the backlight module 14 is assembled to the inner wall of the frame 154 with the periphery thereof. The edge of the bezel 156 of the backlight module 14 is supported on the frame 154, and the frame 154 surrounds the panel module 16. The light guide plate 142 of the backlight module 14 is disposed on the reflector 144, and the frame 154 supports the edge of the light guide plate 142. The edge of the reflector 144 and the edge of the frame 154 of the backlight module 14 are horizontally engaged to each other without overlapping. The light sources 140 of the backlight module 14 are disposed on the frame 154 adjacent to a side of the reflector 144.

In the embodiment, the light sources 140 of the backlight module 14 are LEDs (Light-Emitting Diodes), but the invention is not limited in this regard. The circuit board 146 of the backlight module 14 is electrically connected to the light sources 140 and is adhered to the light guide plate 142 by an adhesive 146a. In an embodiment, the circuit board 146 of the backlight module 14 is a flexible circuit board, but the invention is not limited in this regard. The diffusing film 148, the prism layer 150, and the optical films 152 are sequentially disposed on the light guide plate 142. The bezel 156 supports the edge of the panel module 16 of the display apparatus 1.

The panel module 16 of the display apparatus 1 includes a thin-film transistor substrate 160, a color filter substrate 162, an upper polarizer 164, and a lower polarizer 166. The thin-film transistor substrate 160 and the color filter substrate 162 of the panel module 16 are adhered to each other. The upper polarizer 164 of the panel module 16 is adhered on the color filter substrate 162. The lower polarizer 166 of the panel module 16 is adhered on the thin-film transistor substrate 160.

With this configuration, the light sources 140 of the backlight module 14 are able to emit light into the light guide plate 142, and the light is reflected by the reflector 144 to subsequently pass through the diffusing film 148, the prism layer 150, the optical films 152, the lower polarizer 166, the thin-film transistor substrate 160, the color filter substrate 162, and the upper polarizer 164, and then leave the panel module 16, so that the light is visible to users.

FIG. 2A is a partial top view of components of a display apparatus 1 in FIG. 1A according to an embodiment of the invention, in which an engaging zone EZ is illustrated by dotted lines.

As shown in FIG. 1B, FIG. 1C, and FIG. 2A, the frame 154 of the backlight module 14 further includes a plurality of first extending portions 154a. The first extending portions 154a that are located at a first joint edge of the frame 154 (i.e., the edge of the frame 154 that is connected to the reflector 144) are extended toward the reflector 144 (i.e., a plurality of protruding structures are formed at the first joint edge of the frame 154) for supporting the edge of the light guide plate 142 and horizontally engaging the reflector 144 without overlapping. Therefore, the first extending portions 154a of the frame 154 can extend toward the bottom of the light guide plate 142 to support the light guide plate 142, and any two adjacent first extending portions 154a horizontally engage the edge of the reflector 144 without overlapping. With this configuration, not only can the engaging strength between the frame 154 and the reflector 144 be enhanced, but also, downward drooping of the reflector 144 does not easily occur.

With continued reference to FIG. 1B, FIG. 1C, and FIG. 2A, each of the light sources 140 of the backlight module 14 has a light-emitting surface 140a, and each of the light-emitting surfaces 140a abuts against the light guide plate 142, so that the light generated by the light sources 140 is directly emitted into the light guide plate 142. Because the light sources 140 of the backlight module 14 are disposed on the frame 154, the brightness of the backlight module 14 may be decreased by about 10% (according to the reflectivity of the frame 154) if the frame 154 rather than the reflector 144 is at the front-lower location relative to the light-emitting surfaces 140a of the light sources 140, which may reduce the light utilization rate. In view of this, the reflector 144 of the backlight module 14 further includes a plurality of second extending portions 144a. Each of the second extending portions 144a that is located at a second joint edge (i.e., the edge of the reflector 144 that is connected to the frame 154) of the reflector 144 is extended toward the front-lower location relative to the corresponding light-emitting surface 140a (i.e., a plurality of protruding structures are formed at the second joint edge of the reflector 144), so that the second extending portions 144a and the first extending portions 154a of the frame 154 horizontally form an engaging seam ES without overlapping. Each of the light sources 140 of the backlight module 14 substantially faces the corresponding second extending portion 144a on the reflector 144 and is not located between two adjacent first extending portions 154a.

In an embodiment, owing to inaccuracies occurring during manufacture and/or assembly but which are within manufacturing and assembly tolerances, the light-emitting surface 140a of each of the light sources 140 may not exactly abut against the corresponding second extending portion 144a. Therefore, the light-emitting surface 140a of each of the light sources 140 is slightly moved toward the reflector 144 (the amount of movement is larger than the tolerances), so as to make the light-emitting surface 140a of each of the light sources 140 be located over the corresponding second extending portion 144a (i.e., each of the light sources 140 is located over the interface between the second extending portions 144a of the reflector 144 and the frame 154) and abut against the light guide plate 142, as shown in FIG. 2A. Therefore, even if there are manufacturing and/or assembly inaccuracies, the light-emitting surface 140a of each of the light sources 140 that is located over the corresponding second extending portion 144a of the reflector 144 is positioned to ensure that the light emitted by all the light sources 140 can be completely reflected by the reflector 144.

As shown in FIG. 2A, each of the first extending portions 154a of the frame 154 is engaged between two adjacent second extending portions 144a of the reflector 144, or each of the second extending portions 144a of the reflector 144 is engaged between two adjacent first extending portions 154a of the frame 154, so as to achieve the purpose of horizontally engaging the frame 154 and the reflector 144 without overlapping. Hence, in the horizontal direction, the first extending portions 154a are alternatingly disposed with the second extending portions 144a. However, the invention is not limited in this regard. In another embodiment, some of the first extending portions 154a of the frame 154 are engaged between two adjacent second extending portions 144a of the reflector 144, or some of the second extending portions 144a of the reflector 144 are engaged between two adjacent first extending portions 154a of the frame 154.

In an embodiment, each of the first extending portions 154a of the frame 154 and each of the second extending portions 144a of the reflector 144 are substantially rectangular, but the invention is not limited in this regard. Each of the first extending portions 154a of the frame 154 and each of the second extending portions 144a of the reflector 144 can also be arc-shaped, triangular, a shape formed by lines with different slopes, etc., as long as the shape allows for complete or partial engagement between the first extending portions 154a of the frame 154 and the second extending portions 144a of the reflector 144.

FIG. 2B is a partial top view of components of a display apparatus 1 in FIG. 1A according to another embodiment of the invention, in which an engaging zone EZ is illustrated by dotted lines.

As shown in FIG. 2B, because the light sources 140 are realized using light-emitting diodes, the light emitted by the light sources 140 has a certain diverging angle. In order to prevent the light emitted by the light sources 140 from being reflected by the frame 354 rather than the reflector 344, the horizontal width of each of the second extending portions 344a can be larger than the horizontal width of the light-emitting surface 140a of the corresponding light source 140.

Furthermore, in order to correspond to the diverging angle of the light emitted by the light sources 140, the horizontal widths of each of the second extending portions 344a of the reflector 344 can be gradually expanded in a direction away from the light-emitting surface 140a of the corresponding light source 140. In an embodiment, each of the first extending portions 354a of the frame 354 and each of the second extending portions 344a of the reflector 344 are substantially trapezoidal, but the invention is not limited in this regard.

FIG. 3A is a partial top view of components of a display apparatus 1 in FIG. 2A according to another embodiment of the invention, in which an engaging zone EZ is illustrated by dotted lines. FIG. 3B is a partial top view of components of a display apparatus 1 in FIG. 2B according to another embodiment of the invention, in which an engaging zone EZ is illustrated by dotted lines.

As shown in FIG. 3A, if the problem of inaccuracies within set tolerances can be eliminated through progress in assembling and manufacturing accuracy, each of the light-emitting surfaces 540a of the light sources 540 can be exactly aligned to the edge of the corresponding second extending portion 144a (i.e., each of the light-emitting surfaces 540a of the light sources 540 is exactly located over the interface between the second extending portions 144a of the reflector 144 and the frame 154). Therefore, the light emitted out of the light-emitting surfaces 540a of the light sources 540 of the backlight module 14 can be completely reflected by the second extending portions 144a of the reflector 144, so that the light utilization rate can be improved.

Similarly, if the problem of inaccuracies within set tolerances can be eliminated through progress in assembling and manufacturing accuracy, each of the light-emitting surfaces 540a of the light sources 540 in FIG. 3B can be exactly aligned to the edge of the corresponding second extending portion 344a (i.e., each of the light-emitting surfaces 540a of the light sources 540 is exactly located over the interface between the second extending portions 344a of the reflector 344 and the frame 354). Therefore, the light emitted out of the light-emitting surfaces 540a of the light sources 540 of the backlight module 14 can be completely reflected by the second extending portions 344a of the reflector 344, so that the light utilization rate can be improved.

As shown in FIG. 1B, FIG. 1C, and FIG. 2A, the first extending portions 154a of the frame 154 and the second extending portions 144a of the reflector 144 form the engaging zone EZ. The engaging zone EZ includes the engaging seam ES between the first extending portions 154a and the second extending portions 144a, and the frame 154 and the reflector 144 substantially have the same thickness in the engaging zone EZ. Furthermore, the surface of the frame 154 and the surface of the reflector 144 that contact the bottom of the light guide plate 142 are substantially coplanar. That is, the invention designs the frame 154 and the reflector 144 to be at the same level, so the overall thickness of the display apparatus 1 can be made thinner because the thickness of the reflector 144 is reduced.

As shown in FIG. 1B, FIG. 1C, and FIG. 2A, the display apparatus 1 of the invention further includes a tape 2. The tape 2 is adhered to the external surface of the frame 154 and the external surface of the reflector 144, and extends to the edge of the panel module 16 along the sidewall of the frame 154. In addition, an adhesive area of the tape 2 is able to cover the engaging zone EZ formed by the first extending portions 154a and the second extending portions 144a. By adhering the tape 2 to the engaging zone EZ formed by the first extending portions 154a and the second extending portions 144a, the engaging strength between the frame 154 and the reflector 144 can be further improved. Correspondingly, the supporting capability of the tape 2 can be improved without drooping down after being adhered to the engaging seam ES that is formed by lines with different slopes or different radiuses (e.g., jagged, rack-shaped, wavy, etc.).

Figure 4:
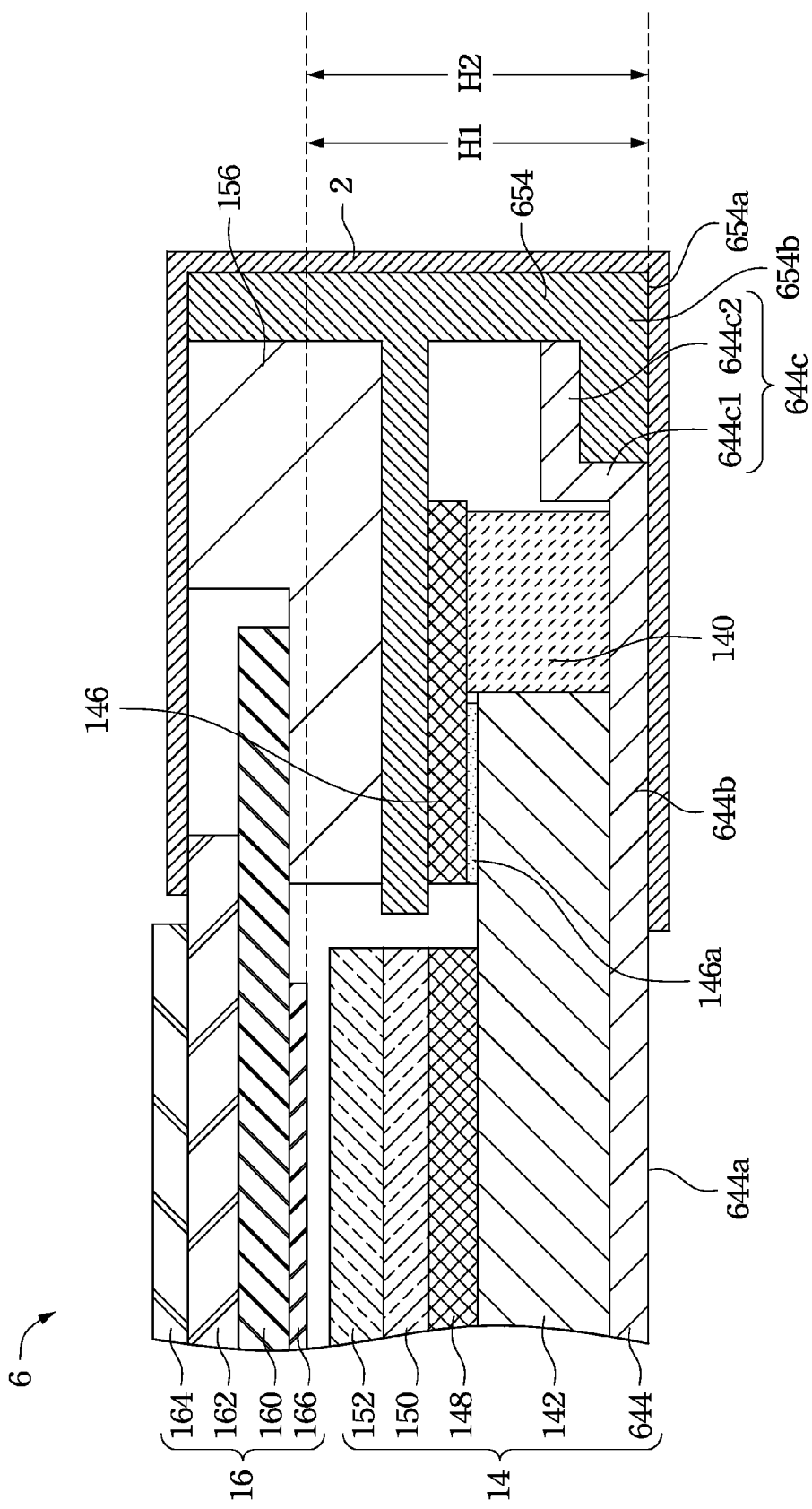
FIG. 4 is a partial sectional view of a display apparatus according to another embodiment of the invention.

FIG. 4 is a partial sectional view of a display apparatus 6 according to another embodiment of the invention.

As shown in FIG. 4, a backlight module 14 of the display apparatus 6 includes light sources 140, a light guide plate 142, a circuit board 146, a diffusing film 148, a prism layer 150, optical films 152, and a bezel 156 as shown in FIG. 1B, and a panel module 16 of the display apparatus 6 includes a thin-film transistor substrate 160, a color filter substrate 162, an upper polarizer 164, and a lower polarizer 166 as shown in FIG. 1B, and so functions of the foregoing components and connection relationships among the components are not repeated here.

A reflector 644 of the backlight module 14 includes a main body 644b and a bending structure 644c. The bending structure 644c of the reflector 644 is located at an edge of the main body 644b. The light guide plate 142 of the backlight module 14 is entirely supported on the main body 644b of the reflector 644. A frame 654 of the backlight module 14 includes an overlapping portion 654b. The bending structure 644c of the reflector 644 overlaps the frame 654 of the backlight module 14.

Furthermore, the bending structure 644c of the reflector 644 includes a first bending portion 644c1 and a second bending portion 644c2. The first bending portion 644c1 of the bending structure 644c is connected to the main body 644b, and is bent relative to the main body 644b toward the panel module 16. The second bending portion 644c2 of the bending structure 644c is connected to the first bending portion 644c1, and is bent relative to the first bending portion 644c1 toward the frame 654, so as to overlap the overlapping portion 654b of the frame 654.

Moreover, the frame 654 of the backlight module 14 has a first lower surface 654a at a side of the frame 654 away from the panel module 16 (i.e., the side of the frame 654 facing downwardly as shown in FIG. 4). The reflector 644 of the backlight module 14 has a second lower surface 644a at a side of the reflector 644 away from the panel module 16 (i.e., the side of the reflector 644 facing downwardly as shown in FIG. 4). The first lower surface 654a of the frame 654 is located at a side of the overlapping portion 654b away from the panel module 16, and the second lower surface 644a is located at a side of the main body 644b away from the panel module 16. The first lower surface 654a of the frame 654 and the second lower surface 644a of the reflector 644 respectively have a first height H1 and a second height H2 relative to the panel module 16. In the embodiment of the invention, the first height H1 is equal to the second height H2. In other words, the first lower surface 654a of the frame 654 and the second lower surface 644a of the reflector 644 are substantially coplanar. Therefore, compared with a known backlight module, the frame 654 and the reflector 644 that respectively include the first lower surface 654a and the second lower surface 644a that are coplanar can decrease the overall thickness of the display apparatus 6 through a reduction in the thickness of the frame 654.

Finally, the backlight module 14 and the panel module 16 can be fixed to each other by adhering the tape 2 from the first lower surface 654a of the frame 654 and the second lower surface 644a of the reflector 644 along the sidewall of the frame 654 to an edge of the panel module 16.

Figure 5:
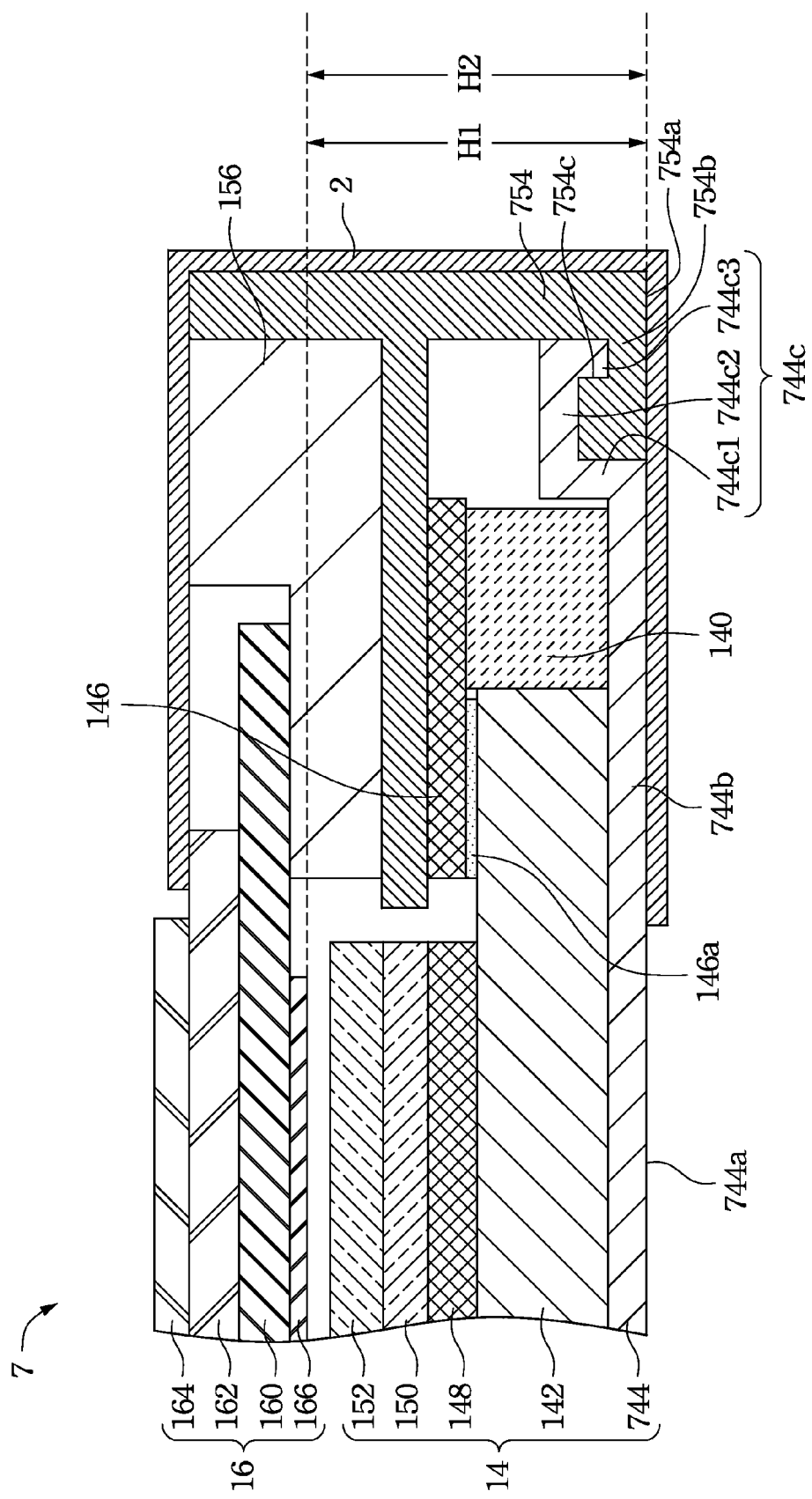
FIG. 5 is a partial sectional view of a display apparatus according to another embodiment of the invention.

FIG. 5 is a partial sectional view of a display apparatus 7 according to another embodiment of the invention.

As shown in FIG. 5, a backlight module 14 of the display apparatus 7 includes light sources 140, a light guide plate 142, a circuit board 146, a diffusing film 148, a prism layer 150, optical films 152, and a bezel 156 as shown in FIG. 4, and a panel module 16 of the display apparatus 7 includes a thin-film transistor substrate 160, a color filter substrate 162, an upper polarizer 164, and a lower polarizer 166 as shown in FIG. 4, and so functions of the foregoing components and connection relationships among the components are not repeated here.

In addition, a frame 754 of the backlight module 14 includes an overlapping portion 754b. A reflector 744 of the backlight module 14 includes a main body 744b and a bending structure 744c. The bending structure 744c of the reflector 744 includes a first bending portion 744c1 and a second bending portion 744c2. Moreover, the overlapping portion 754b of the frame 754 further includes a first hook 754c. The first hook 754c of the overlapping portion 754b is formed at a side of the overlapping portion 754b adjacent to the panel module 16 (i.e., the side of the overlapping portion 754b facing upwardly as shown in FIG. 5). The second bending portion 744c2 of the bending structure 744 includes a second hook 744c3. The second hook 744c3 of the second bending portion 744c2 is formed at a side of the second bending portion 744c2 away from the panel module 16 (i.e., the side of the second bending portion 744c2 facing downwardly as shown in FIG. 5). The first hook 754c of the overlapping portion 754b is engaged with the second hook 744c3 of the second bending portion 744c2, so as to achieve the function of preventing the frame 754 and the reflector 744 from separating along the horizontal direction in FIG. 5. In the embodiment of the invention, the bending structure 744c of the reflector 744 is substantially inverted U-shaped, but the invention is not limited in this regard.

The frame 754 of the backlight module 14 has a first lower surface 754a at a side of the frame 754 away from the panel module 16 (i.e., the side of the frame 754 facing downwardly as shown in FIG. 5), and the reflector 744 of the backlight module 14 has a second lower surface 744a at a side of the reflector 744 away from the panel module 16 (i.e., the side of the reflector 744 facing downwardly as shown in FIG. 5). The first lower surface 754a of the frame 754 and the second lower surface 744a of the reflector 744 respectively have a first height H1 and a second height H2 relative to the panel module 16. In the embodiment of the invention, the first height H1 is equal to the second height H2. In other words, the first lower surface 754a of the frame 754 and the second lower surface 744a of the reflector 744 are substantially coplanar. Therefore, compared with a known backlight module, the frame 754 and the reflector 744 that respectively include the first lower surface 754a and the second lower surface 744a that are coplanar can decrease the overall thickness of the display apparatus 7 through a reduction in the thickness of the frame 754.

Figure 6:
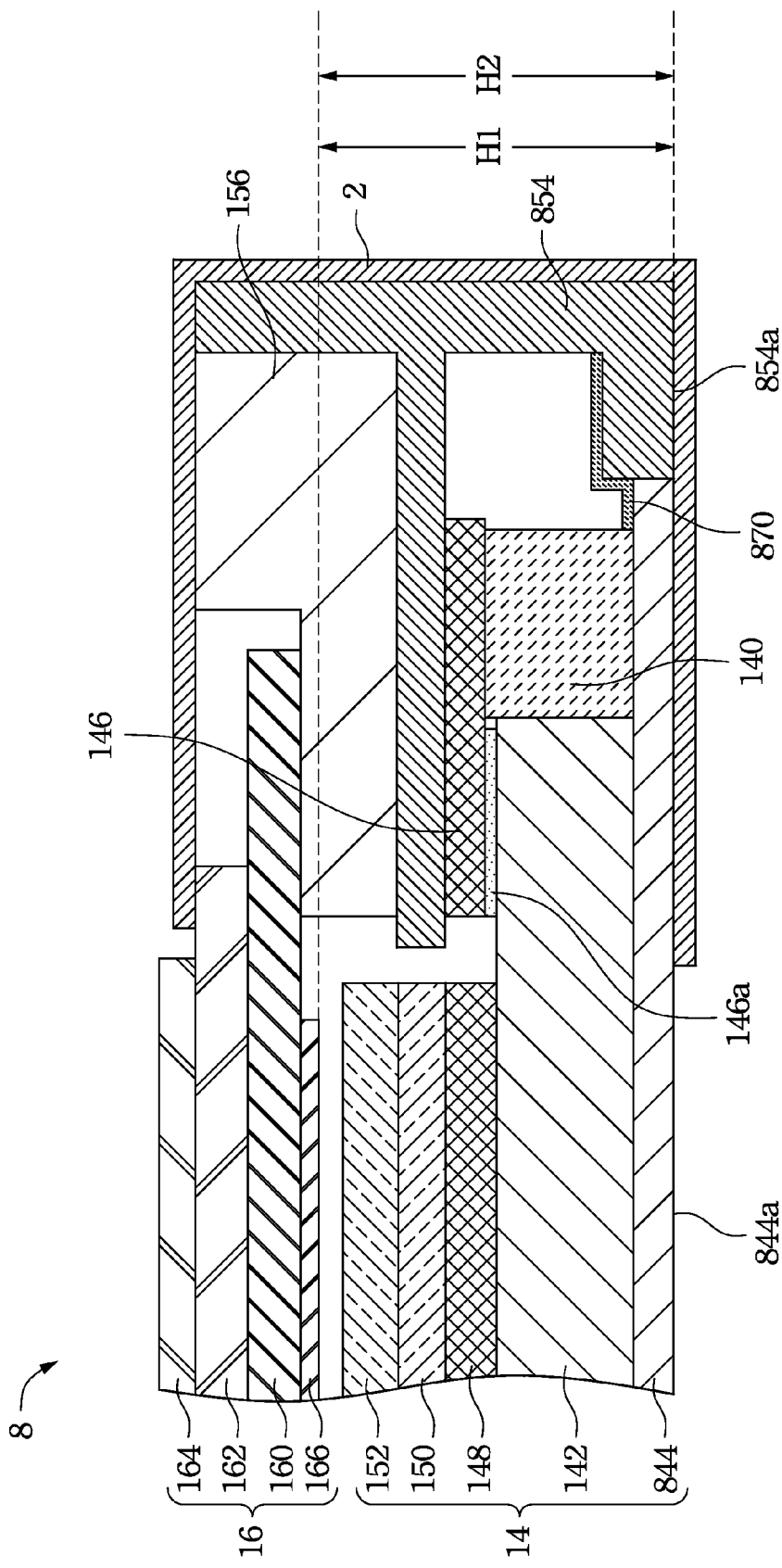
FIG. 6 is a partial sectional view of a display apparatus according to another embodiment of the invention.

FIG. 6 is a partial sectional view of a display apparatus 8 according to another embodiment of the invention.

As shown in FIG. 6, a backlight module 14 of the display apparatus 8 includes light sources 140, a light guide plate 142, a circuit board 146, a diffusing film 148, a prism layer 150, optical films 152, and a bezel 156 as shown in FIG. 1B, and a panel module 16 of the display apparatus 8 includes a thin-film transistor substrate 160, a color filter substrate 162, an upper polarizer 164, and a lower polarizer 166 as shown in FIG. 1B, and so functions of the foregoing components and connection relationships among the components are not repeated here.

The light guide plate 142 of the backlight module 14 is entirely supported on a reflector 844. An edge of the reflector 844 of the backlight module 14 abuts against a frame 854. The display apparatus 8 further includes a single sided adhesive tape 870. The single sided adhesive tape 870 of the display apparatus 8 is adhered to a side of the frame 854 and the reflector 844 adjacent to the panel module 16 (i.e., the side of the frame 854 and the reflector 844 facing upwardly as shown in FIG. 6), so as to join the frame 854 and the reflector 844. Accordingly, the upper side and the lower side of the frame 854 and the reflector 844 of the backlight module 14 are respectively adhered by the single sided adhesive tape 870 and the tape 2, so that the frame 854 and the reflector 844 can be firmly fixed to each other.

The frame 854 of the backlight module 14 has a first lower surface 854a at a side of the frame 854 away from the panel module 16 (i.e., the side of the frame 854 facing downwardly as shown in FIG. 6), and the reflector 844 of the backlight module 14 has a second lower surface 844a at a side of the reflector 844 away from the panel module 16 (i.e., the side of the reflector 844 facing downwardly as shown in FIG. 6). The first lower surface 854a of the frame 854 and the second lower surface 844a of the reflector 844 respectively have a first height H1 and a second height H2 relative to the panel module 16. In the embodiment of the invention, the first height H1 is equal to the second height H2. In other words, the first lower surface 854a of the frame 854 and the second lower surface 844a of the reflector 844 are substantially coplanar. Therefore, compared with a known backlight module, the frame 854 and the reflector 844 that respectively includes the first lower surface 854a and the second lower surface 844a that are coplanar can decrease the overall thickness of the display apparatus 8 through a reduction in the thickness of the frame 854.

Figure 7:
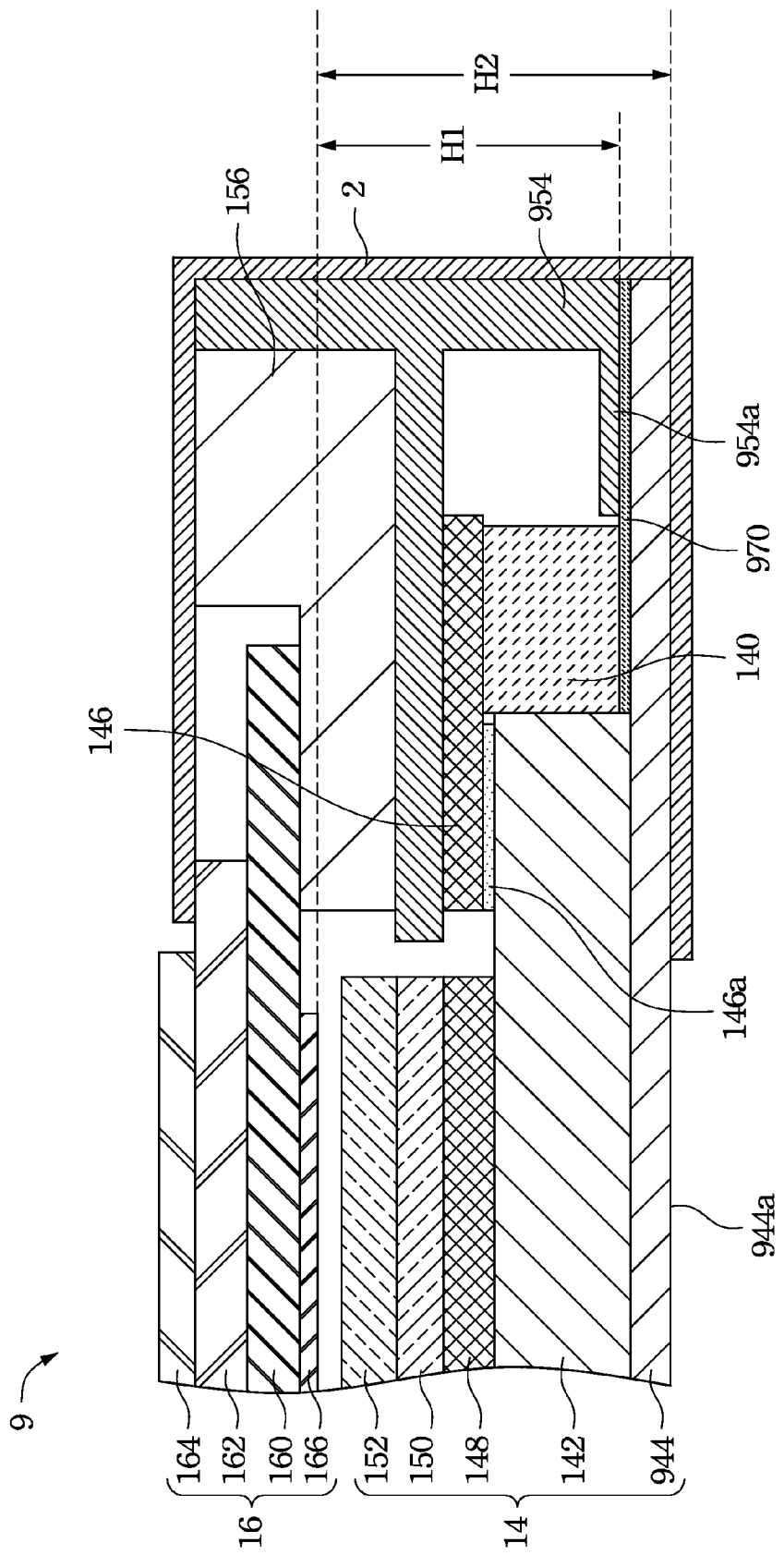
FIG. 7 is a partial sectional view of a display apparatus according to another embodiment of the invention.

FIG. 7 is a partial sectional view of a display apparatus 9 according to another embodiment of the invention.

As shown in FIG. 7, a backlight module 14 of the display apparatus 9 includes light sources 140, a light guide plate 142, a circuit board 146, a diffusing film 148, a prism layer 150, optical films 152, and a bezel 156 as shown in FIG. 1B, and a panel module 16 of the display apparatus 9 includes a thin-film transistor substrate 160, a color filter substrate 162, an upper polarizer 164, and a lower polarizer 166 as shown in FIG. 1B, and so functions of the foregoing components and connection relationships among the components do not repeated here.

The light guide plate 142 of the backlight module 14 is entirely supported on a reflector 944. The frame 954 of the backlight module 14 has a first lower surface 954a at a side of the frame 954 away from the panel module 16 (i.e., the side of the frame 954 facing downwardly as shown in FIG. 7), and the reflector 944 of the backlight module 14 has a second lower surface 944a at a side of the reflector 944 away from the panel module 16 (i.e., the side of the reflector 944 facing downwardly as shown in FIG. 7). The first lower surface 954a of the frame 954 and the second lower surface 944a of the reflector 944 respectively have a first height H1 and a second height H2 relative to the panel module 16. In the embodiment of the invention, the first height H1 is smaller than the second height H2. The display apparatus 9 further includes a double-sided adhesive tape 970. The double-sided adhesive tape 970 of the display apparatus 9 is adhered between a first lower surface 954a of the frame 954 and an upper surface of the reflector 944 (i.e., a surface of the reflector 944 opposite to the second lower surface 944a), so as to join the frame 954 and the reflector 944.

In the embodiment of the invention realized through the above configuration, the first lower surface 954a of the frame 954 is closer to the panel module 16 than the upper surface of the reflector 944, and so the first lower surface 954a of the frame 954 can be supported and adhered on the upper surface of the reflector 944 by the double-sided adhesive tape 970. Therefore, compared with a known backlight module, the embodiment can decrease the overall thickness of the display apparatus 9 through a reduction in the thickness of the frame 954.

According to the foregoing recitations of the embodiments of the invention, it can be seen that the frame and the reflector of a backlight module of the display apparatus are designed to be at the same level, so that the overall thickness of the display apparatus can be decreased through a reduction in the thickness of the reflector. In addition, in order to support the light guide plate of the backlight module, support from the frame is necessary under the light guide plate. Therefore, the frame of the invention is designed to partially extend toward the light guide plate, so as to achieve the function of supporting the light guide plate. Furthermore, the invention extends the reflector to a front-lower location relative to the light-emitting surfaces of the light sources of the backlight module, so that the backlight module provides a sufficient brightness to meet requirements. That is, the reflector of the invention has light-reflecting portions that are partially extended to the light sources, so that the reflector provides a design for improving light utilization rate. Moreover, the invention also designs the edge of the frame and the edge of reflector that are engaged to each other in a manner such that these edges are not straight. Through such a configuration of the frame and the reflector, not only is the engaging strength between the frame and the reflector enhanced, but also, downward drooping of the reflector does not easily occur.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display apparatus comprising:
   a panel module; and
   a backlight module disposed under the panel module, the backlight module comprising:
      a frame;
      a reflector, an edge of which overlaps the frame; and
      a light guide plate supported on the reflector,
   wherein the frame and the reflector respectively have a first lower surface and a second lower surface at a side of the frame and the reflector away from the panel module, the first lower surface and the second lower surface respectively have a first height and a second height relative to the panel module, and the first height is equal to or smaller than the second height.

2. The display apparatus of claim 1, wherein the frame comprises an overlapping portion, the first lower surface is located at a side of the overlapping portion away from the panel module, and the reflector comprises:
   a main body, wherein the light guide plate is supported on the main body, and the second lower surface is located at a side of the main body away from the panel module; and a bending structure located at an edge of the main body and overlapping the overlapping portion.

3. The display apparatus of claim 2, wherein the bending structure comprises:
a first bending portion connected to the main body and bent relative to the main body toward the panel module; and
a second bending portion connected to the first bending portion and bent relative to the first bending portion toward the frame, so as to overlap the overlapping portion.

4. The display apparatus of claim 2, wherein the overlapping portion has a first hook, the bending structure has a second hook, and the first hook is engaged with the second hook.

5. The display apparatus of claim 4, wherein the bending structure is substantially inverted U-shaped.

6. The display apparatus of claim 1, further comprising a single sided adhesive tape adhered to a side of the frame and the reflector adjacent to the panel module for joining the frame and the reflector.

7. The display apparatus of claim 1, further comprising a double-sided adhesive tape adhered between the first lower surface and the reflector for joining the frame and the reflector.

\* \* \* \* \*